Figure 1:
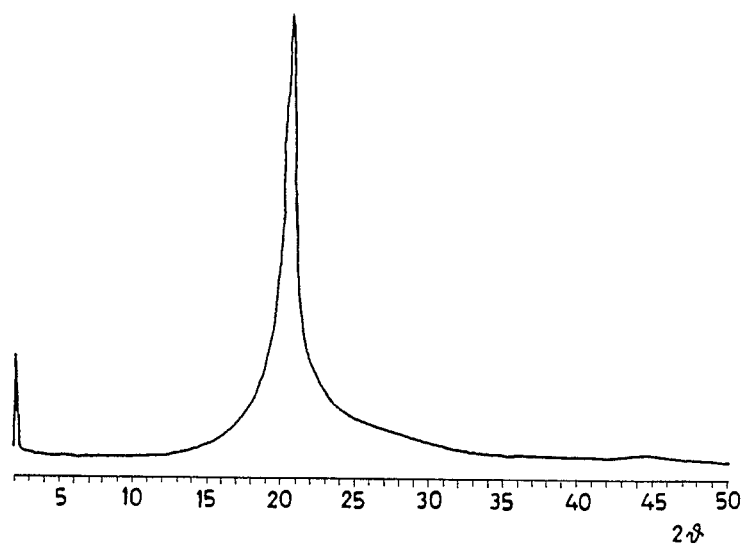

| United States Patent [19] | [11] Patent Number: 4,833,229 |
| Magagnini et al. | [45] Date of Patent: May 23, 1989 |

[54] THERMOTROPIC COPOLYESTER HAVING A NEMATIC STRUCTURE OF THE LIQUID-CRYSTALLINE PHASE

[75] Inventors: Pierluigi Magagnini, Pisa; Ugo Pedretti; Giovanni Perego, both of Milan; Bruno Bresci; Simona Carrozzino, both of Pisa; Arnaldo Roggero, Milan, all of Italy

[73] Assignee: Eniricerche S.p.A., Milan, Italy

[21] Appl. No.: 167,106

[22] Filed: Mar. 11, 1988

[30] Foreign Application Priority Data

Mar. 16, 1987 [IT] Italy ................ 19712 A/87

[51] Int. Cl.$^4$ ............................. C08G 63/18
[52] U.S. Cl. ................... 528/193; 528/176; 528/271; 525/425; 525/439; 525/444
[58] Field of Search ............ 528/193, 176, 271; 525/425, 439, 444

[56] References Cited

U.S. PATENT DOCUMENTS 4,599,397 7/1986 Yoshimura et al. ............... 528/176
4,762,907 8/1988 Kock ................................... 528/193

*Primary Examiner*—Harold D. Anderson
*Assistant Examiner*—T. Mason
*Attorney, Agent, or Firm*—Oblon, Fisher, Spivak, McClelland & Maier

[57] ABSTRACT

A thermotropic copolyester, having a nematic structure of the liquid-crystalline phase within a desired range of mesophase temperature, contains units derived from a saturated aliphatic dicarboxylic acid, 4,4'-dihydroxybiphenyl and p-hydroxybenzoic acid, in a mutual ratio of from 1:1:0.5 to 1:1:8.

This thermotropic copolyester is produced by copolymerizing in the molten state a saturated aliphatic dicarboxylic acid, 4,4'-diacyloxybiphenyl and p-acyloxybenzoic acid.

The use is disclosed of the thermotropic copolyester as a self-reinforced material, and as a reinforcer material for such traditional thermoplastic polymers as polybutylene terephthalate, polyethylene terephthalate, polycarbonate and nylon.

6 Claims, 2 Drawing Sheets

COPOLYMER 1:1:0,5

THERMOTROPIC COPOLYESTER HAVING A NEMATIC STRUCTURE OF THE LIQUID-CRYSTALLINE PHASE

The present invention is concerned with a thermotropic copolyester, the process for preparing it, and its use.

In the art, polymers are known, which are capable of maintaining a high degree of order in the polymeric chains in the liquid state, and have hence the typical behaviour of liquid crystal.

In particular, two classes of such polymers are known, and, more particularly, the lyotropic polymers, which originate ordered systems in solution, and the thermotropic polymers, which originate ordered systems in the molten state.

Many of the thermotropic polymers known from the prior art are of polyester nature, and can be processed in the molten state, and converted into fibres, films, or self-reinforced finished articles, generally having a high mechanical strength, induced by effects of molecular orientation.

A sector of potential application for thermotropic polymers consists in their use as reinforcer materials for traditional thermoplastic polymers.

At present, such thermoplastic polymers as nylon, polybutylene terephthalate, polyethylene terephthalate and polycarbonate, are reinforced with such materials as fiberglass, and this when endowing the respective manufactured articles with advantageous characteristics, in particular as regards their modulus, dimensional stability and mechanical strength, is desired. The disadvantages deriving from the use of such reinforcer materials essentially consist in the wear which takes place in the equipment, due to the abrasion exerted by fiberglass, in the difficulties met when processing such a mass, due to the high viscosity of the molten material, which also causes high power consumptions, and in the problems of adhesion between fiberglass and the thermoplastic matrix it is embedded in.

Therefore, the need exists in the art, for reinforcing the traditional thermoplastic polymers with novel reinforcer materials which make it possible the above problems and drawbacks to be overcome.

Most thermotropic polyesters known from the prior art show a completely aromatic structure, generally with very high melting points, and, as such, they are useful for the production of self-reinforced manufactured articles, but not as reinforcer materials for traditional thermoplastic polymers.

In fact, for this latter use, it is required that the liquid-crystalline polymer is in the mesophase state (i.e., the temperature range inside which the liquid-crystalline phase exists) in correspondence of the temperature range inside which the thermoplastic polymers are processed in the molten state.

Furthermore, from the prior art, thermotropic polymers of polyester nature are known, which show a structure with an alternation of rigid units (of aromatic character) bonded to each other by flexible segments (of aliphatic nature), such as, e.g., the thermotropic polyesters, which contain in their macromolecule units derived from 4,4'-dihydroxybiphenyl and from a saturated aliphatic dicarboxylic acid, described by Asrar et al. in Journal of Polymer Science, Polymer Physics Ed., 21, 1119 (1983) and by Krigbaum et al. in Macromolecules, 16, 1271 (1983).

These thermotropic polymers, although generally show melting temperatures and isotropization temperatures, hence mesophase temperature ranges, lower than of the completely aromatic thermotropic polyesters, show unsatisfactory characteristics for use as reinforcer materials for thermoplastic polymers. In fact, they show poor mechanical properties, probably due to the smectic nature of the mesophase.

As a matter of fact, a thermotropic polymer, suitable for use as a reinforcer material for thermoplastic polymers, should have a desired set of characteristics, and, more precisely:

a mesophase temperature range falling within the temperature range within which the thermoplastic polymers are processed in the molten state, and a nematic structure (i.e., with a unidimensional order) of the liquid-crystalline phase;

an easy orientability inside the thermoplastic matrix;

a substantial immiscibility with the thermoplastic polymer to be reinforced, however with a good adhesion to the same thermoplastic polymer;

characteristics of processability of the blend with the thermoplastic polymer on normal equipment, and under normal conditions of injection moulding, also taking advantage of the possible enhancement in the rheological characteristics of the same blend, as induced by the presence of the nematic phase.

The present Applicant surprisingly found now that by reacting in the molten state, according to suitable ratios and under suitable experimental conditions, a 4,4'-diacyloxybiphenyl, a saturated α,ω-dicarboxylic aliphatic acid and a para-acyloxybenzoic acid, a copolyester is obtained, which is provided with considerably improved mechanical properties as compared to those of the corresponding copolyesters obtained in the absence of para-acyloxybenzoic acid. This copolyester is characterized by a nematic structure of the mesophase, which results to be stable within a temperature range comprising the temperatures at which the traditional thermoplastic polymers are processed, and therefore it can be used in a mixture with them, in order to obtain reinforced materials.

In accordance therewith, the present invention, according to an aspect thereof, is concerned with a thermotropic copolyester having a nematic phase comprised within the range of from approximately 200° C. to approximately 300° C., and which contains in its macromolecule units deriving from:

(A) a saturated aliphatic dicarboxylic acid:

wherein n is comprised within the range of from 3 to 8;

(B) 4,4'-dihydroxybiphenyl:

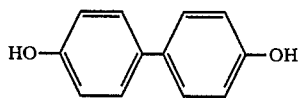

(C) p-hydroxybenzoic acid:

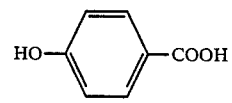

wherein the ratio of (A), (B) and (C) units to one another is comprised within the range of from 1:1:0.5 to 1:1:8.

The copolyesters of the present invention wherein the mutual ratio of (A), (B) and (C) units is comprised within the range of from 1:1:0.5 to 1:1:3, shows a partial or complete solubility in such polar solvents as, e.g., phenol-tetrachloroethane (60-40) blends, pentafluorophenol, trifluoroacetic acid, and still others. Such solutions normally show intrinsic viscosities, measured at 25° C. and with an Ubbelhode viscometer, of the order of from 0.8 to 2 dl/g, at a polymer concentration of 0.5 g/dl. The polymerization degree of such copolyester can anyway be increased by means of suitable contrivances, by operating either during the polymerization step, or on the already formed polymer.

In the preferred form, the thermotropic copolyester of the present invention contains (A), (B) and (C) units within the range of ratios of from 1:1:1 to 1:1:2.5, and the value of n in (A) unit ranges from 4 to 8.

The structural characterization of the thermotropic copolyesters of the present invention was mainly carried out by X-ray diffraction, using a vertical Philips gniometer, equipped with impulse-counting electronics, and Cuk $\alpha$ radiation.

The X-ray diffraction spectrum at room temperature of the thermotropic copolyesters of the present invention which contain (A), (B) and (C) units within the range of ratios of from 1:1:0.5 to approximately 1:1:1, is practically characterized by the presence of one single, very intense reflection at an angle value $2\theta$ of 20°-21°, which indicates a pseudo-hexagonal crystalline phase containing essentially random copolymeric sequences. The persistence of some very weak reflections at $2\theta$ smaller than 10°, typical for the homopolymer obtained from (A) and (B) units, indicates the presence of some residual blocks deriving from same (A) and (B) units.

The thermotropic copolyesters which contain (A), (B) and (C) units within the range of from approximately 1:1:1 to approximately 1:1:2.5, show the pseudo-hexagonal phase, with the substantial absence of blocks deriving from (A) and (B) units.

Finally, the thermotropic copolyesters which contain (A), (B) and (C) units within the range of from approximately 1:1:2.5 to approximately 1:1:8, show a crystalline segregation of blocks derived from (C) units, with variable amounts of pseudo-hexagonal phase.

The pseudo-hexagonal structure is characterized by a temperature of transition from crystal to nematic mesophase of 210°-230° C., at least in those thermotropic copolyesters wherein the ratio of (A), (B) and (C) units is comprised within the range of from 1:1:1 to 1:1:2.5.

The temperature of transition from nematic mesophase to the isotropic state is in any case higher than 300° C. The crystal/mesophase and mesophase/isotropic state transitions were determined by differential scanning calorimetry (DSC), using a Mettler TA 3000 equipment. As an alternative to DSC, the above transition temperatures were measured by optical microscope under polarized light, equipped with heating table. The nematic nature of the mesophase, at least for the composition range of from 1:1:1 to 1:1:2.5, was confirmed by means of tests carried out by X-ray diffraction on copolyester samples heated at temperatures comprised within the range of from 200° to 300° C.

The thermotropic copolyesters according to the present invention are prepared by copolymerizing, in the molten state, a saturated aliphatic $\alpha,\omega$-dicarboxylic acid, 4,4'-diacyloxybiphenyl and para-acyloxybenzoic acid.

Examples of saturated aliphatic, $\alpha,\omega$-dicarboxylic acids useful for the intended purpose are sebacic acid, suberic acid and adipic acid.

The preferred 4,4'-diacyloxybiphenyl is 4,4'-diactyloxybiphenyl, which can be obtained by reacting 4,4'-dihydroxybiphenyl with acetic anhydride.

The preferred para-acyloxybenzoic acid is para-acetoxybenzoic acid, which can be obtained by reacting para-hydroxybenzoic acid and acetic anhydride.

The reaction of polymerization is carried out in the presence of catalysts constituted by dialkyl-tin oxides, diaryl-tin oxides, titanium dioxide, antimony dioxide, titanium alkoxides and carboxylates of alkali and alkali-earth metals. The preferably used catalyst is sodium acetate. Using a catalyst amount of from 0.01 to 1 part by weight per each 100 parts by weight of the monomers undergoing polymerization is generally advantageous.

The polymerization is carried out by making temperature vary from the melting temperature of the reactant mixture (200°-220° C.), up to an end temperature which may be as high as 350° C., but which normally is of approximately 285°-290° C.

During the polymerization, carboxy acid, in the preferred form of practical embodiment acetic acid, develops, which is removed from the reaction mixture. It is advantageous to operate under reduced pressure, at least during the end step of the polymerization, in order to eliminate the reaction byproduct carboxylic acid, and other possible low-molecular weight compounds, so as to increase the polymerization degree up to the desired level.

The required times for the polymerization to take place may generally vary within the range of from 1 to 10 hours, and, preferably, of from 3 to 6 hours.

The so-obtained thermotropic copolyester is recovered and purified.

The most advantageous treatment consists is a long-time extraction at boiling temperature with suitable solvents, such as chloroform and acetone. For soluble products, also the procedure of precipitation from solution can be used.

The thermotropic copolyesters of the present invention can be transformed by means of usual processing techniques, such as injection-moulding and extrusion. By means of the extrusion technique; sometimes preferred orientations in flow direction can be induced, which can be enhanced by stretching. The mechanical properties have been measured on extruded, and, sometimes, stretched, copolyesters.

The highest values of extensional moduli normally obtained are of approximately 15 GPa, and the values of tensile strengths are of approximately 0.2 GPa.

The thermotropic copolyesters of the present invention can also be used as reinforcer agents for traditional thermoplastic materials, such as, e.g., polycarbonate, polybutadiene terephthalate, polyethylene terephthalate and nylon, in order to yield compositions which contain from approximately 5 to approximately 30 parts by weight of liquid-crystalline copolyester per each 100 parts by weight of thermoplastic polymer. The improvement in mechanical properties which can be obtained by blending the thermoplastic polymer with the liquid-crystalline copolyester of the present invention, can be evaluated to be, for the highest concentrations of the reinforcer agent, of around 80-150% for the value of the elastic modulus, and of approximately 50-100% for the tensile strength.

Furthermore, these compositions show improved rheological characteristics. In particular, the above mentioned blends can be extruded by the normal techniques at temperatures 10°-15° lower than necessary temperatures for extruding the molten thermoplastic polymers.

In the following experimental examples, thermotropic copolyesters according to the present invention were prepared, which contain (A), (B) and (C) units in the indicated proportions.

Furthermore, compositions were prepared, which contain said thermotropic copolyesters and a traditional thermoplastic polymer, in particular polycarbonate and polybutylene terephthalate.

In particular, in the synthesis of polyesters and copolyesters, used were: sebacic acid, adipic acid and suberic acid—as the saturated aliphatic dicarboxylic acids; 4,4'-diacetoxybiphenyl, and p-acetoxybenzoic acid.

The saturated aliphatic dicarboxylic acids were acids available from the market, and showed a purity, measured by a DSC technique, of the order of 98-99%.

4,4'-Diacetoxybiphenyl was prepared from 4,4'-dihydroxybiphenyl and acetic anhydride by means of the following procedure.

To a two-neck flask equipped with stopcock, reflux condenser and magnetic stirring, 250 ml of acetic anhydride, 100 g (537 mmol) of 4,4'-dihydroxy-biphenyl and a few drops of concentrated sulphuric acid are charged. The addition of the acid causes the biphenol to immediately dissolve. The mixture is heated at 140° C. for 12 hours and then, after cooling, is poured into approximately 800 ml of water. A white solid separates, which is filtered, washed with a few water containing 1% by weight of potassium hydroxide, and then with water, up to neutral pH. The reaction product is crystallized twice, a first time from ethanol and a second time from acetone, with a yield of 4,4'-diacetoxy-biphenyl of the order of 85-90%. The DSC spectrum of the crystallized product shows a melting endothermic peak at 163° C., with a purity higher than 99.5%.

p-Acetoxybenzoic acid was prepared from p-hydroxybenzoic acid and acetic anhydride, by means of the following procedure.

To a two-neck flask, equipped with stopcock, reflux condenser and magnetic stirring, 170 ml of acetic anhydride, 100 g (724 mmol) of p-hydroxybenzoic acid, and a few drops of concentrated sulphuric acid are charged. The mixture is heated at 140° C. (with a complete dissolution being obtained) for one hour, then the reaction mass is cooled and poured into approximately 800 ml of water. A white solid precipitates, which is filtered, washed with three portions of aqueous potassium hydroxide at 1% by weight, and then with water up to neutral pH. The reaction product is crystallized three times from toluene, with a yield of approximately 80%. The obtained p-acetoxybenzoic acid shows, on DSC examination, a melting point of approximately 186° C., with a purity degree of the order of 95-96%.

In the preparation of the thermotropic copolyesters, the following general procedure was used.

A reactor, connected with a Brignole seal, which can operate under an end vacuum of 0.01 mm$_{Hg}$, and equipped with a very-high-torque motor, capable of stirring even very viscous molten materials, is used. To the flask, the monomers are charged together with an amount of sodium acetate of 0.2 parts by weight per each 100 parts by weight of monomers.

The flask is then washed with vacuum-nitrogen, in order to remove present oxygen as completely as possible. Then, with a weak nitrogen stream being flown, the reaction mass is heated by means of a molten-salt bath previously heated to 220° C. Under these conditions, the reactants melt, and the polymerization begins, with acetic acid being released, which is removed from the polymerization chamber and is condensed inside a cold test tube maintained at −78° C. with solid carbon dioxide. The temperature of the bath is increased to 240° C. within a 90-minute time, and then to 270° C. during the following 90 minutes. The reaction mass is then maintained for 2 hours at 270° C., under a vacuum of 0.2 mm$_{Hg}$. At the end of this time period, the molten-salt bath is removed, and the reaction mass is allowed to cool under vacuum. The copolyester is recovered and finely ground in the presence of dry ice, or of liquid nitrogen.

The copolyester is finally purified by extraction with either chloroform or acetone at boiling temperature.

The so-obtained purified copolyester is characterized by means of a whole set of chemical-physical techniques, as hereinabove mentioned.

In particular, when the polymer is soluble, measurements of intrinsic viscosity are carried out. The structural characterization is carried out by X-ray diffraction, and the thermal properties are determined by DSC or optical microscopy.

EXAMPLE 1

To a three-neck flask, equipped with a stirrer connected with a Brignole seal, and equipped with a tube for nitrogen inlet and a condenser, the following reactants:

(A) 6 grams of sebacic acid (0.0296 mol),
(B) 8 grams of 4,4'-diacetoxybiphenyl (0.0296 mol),
(C) 10.4 grams of p-acetoxybenzoic acid (0.0592 mol),
(D) 0.04 grams of sodium acetate (0.00049 mol)
are charged.

The reactant mixture is heated to 220° C. with a molten-salt bath.

At this temperature, the complete melting occurs of the reaction mass, which is stirred under a slight nitrogen flow. The reaction temperature is gradually heated to 280° C. within a 3-hour time, and acetic acid is distilled and condensed inside a test tube maintained at −78° C. with dry carbon dioxide. During this time period, the viscosity of the molten mass gradually increases, and simultaneously the stirring speed decreases.

The nitrogen flow is subsequently discontinued, and the molten material is submitted, still at 280° C., to a pressure reduction down to an end vacuum of $10^{-2}$ mm$_{Hg}$. The reaction continues under these conditions for a further 2 hours; then the reaction mass is cooled, still under vacuum, down to room temperature.

The obtained polymer is mixed with dry carbon dioxide, and is finely ground inside a blade mill.

The polymer is then extracted inside a Soxhlet device, with boiling chloroform, for 8 hours, and is then dried inside a vacuum oven, at 70° C., for 2 hours.

15.5 grams of copolyester is obtained, with a yield equal to 89.6% of the theoretical value.

The intrinsic viscosity (I.V.) is of about 1.7 dl/g and is measured at 25° C. in solution in phenol-tetrachloroethane (60-40 by weight) at a concentration of 0.5 g/dl.

The obtained product is characterized by the X-ray diffraction spectrum reported in FIG. 1, typical of the pseudo-hexagonal phase.

It has a crystal-nematic mesophase transition, measured via DSC, at 211° C.

EXAMPLE 2

To a three-neck flask, equipped with a stirrer connected with to a Brignole seal, a tube for nitrogen inlet and a condenser, the following reactants:
(A) 6 grams of sebacic acid (0.0296 mol),
(B) 8 grams of 4,4'-diacetoxybiphenyl (0.0296 mol),
(C) 2.6 grams of p-acetoxybenzoic acid (0.0148 mol),
(D) 0.025 grams of sodium acetate (0.0003 mol)
are charged.

The process is carried out as in Example 1, and 11.2 g is obtained of copolyester, with a yield of 92% of theoretical value.

The intrinsic viscosity is of approximately 0.8 dl/g, measured at 25° C.

Figure 2:
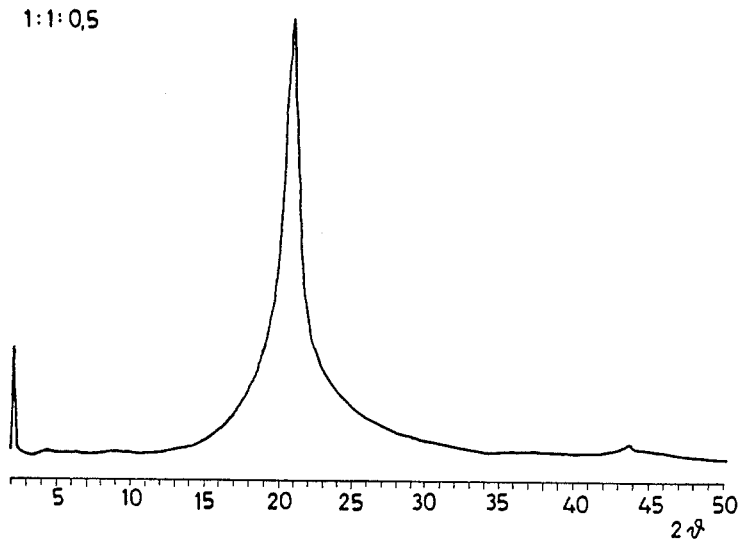

The obtained product shows the X-ray diffraction spectrum reported in FIG. 2, characterized by a pseudo-hexagonal phase with the presence of residual blocks due to (A) and (B) units. The crystal-nematic mesophase transition temperature, measured via DSC, takes place at 230° C.

EXAMPLE 3

To a three-neck flask, equipped with a stirrer connected with a Brignole seal, a tube for nitrogen inlet and a condenser, the following reactants:
(A) 6 grams of sebacic acid (0.0296 mol),
(B) 8 grams of 4,4'-diacetoxybiphenyl (0.0296 mol),
(C) 20.8 grams of p-acetoxybenzoic acid (0.118 mol),
(D) 0.05 grams of sodium acetate (0.00061 mol)
are charged.

The process is carried out as in Example 1, and 21.3 g is obtained of copolyester, with a yield of 88% of theoretical value.

The intrinsic viscosity is of approximately 1.2 dl/g, measured at 25° C.

Figure 3:
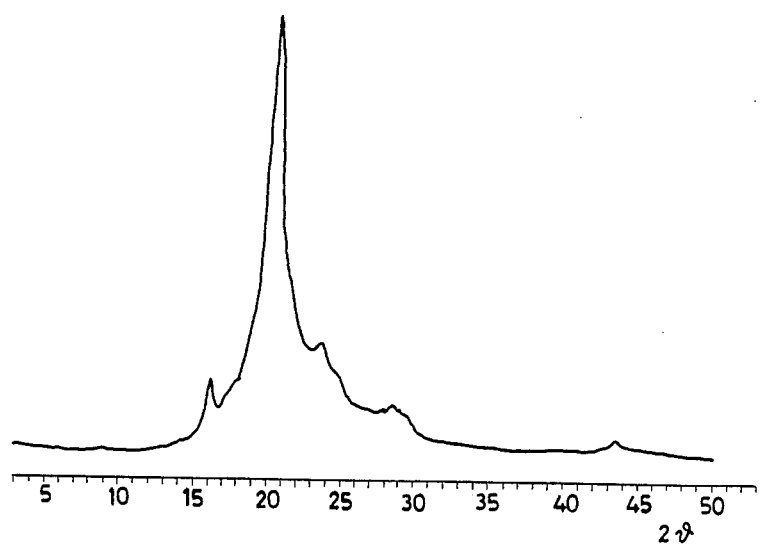

The obtained product is characterized by the X-ray diffraction spectrum reported in FIG. 3. The spectrum shows the presence of the pseudo-hexagonal phase, and of a crystalline phase, due to only (C) unit. The DSC analysis evidences a very weak transition at 227° C., which can be attributed to the crystal-nematic mesophase transition of the fraction of crystallized material in the pseudo-hexagonal phase.

EXAMPLE 4

The copolyester obtained by the procedure as disclosed in Example 1 and polybutylene terephthalate, in a ratio of 30:100 by weight, are blended in the molten state on a 30-cc Brabender mixer, at a temperature of 230° C. The obtained blend is finely ground in the presence of dry ice and, after drying for 4 hours at 140° C. inside a ventilated oven, is extruded at 225° C., using a molten-spinning unit equipped with a piston operating at a constant speed, and with a conical die having a semi-angle of 23°, and a diameter of the outlet bore of 0.5 mm. The extruded filament is stretched, by using a variable-speed collecting unit, with a $v_f/v_0$ ratio=20.

The value of the extensional modulus is comprised within the range of from 13 to 15 GPa, and the tensile strength has a value comprised within the range of from 0.1 to 0.2 GPa. The mechanical properties were measured by means of an Instron Model 6025, at an elongation speed of 0.33 min$^{-1}$.

The extrudate shows, when X-ray examined, the typical crystalline phases of polybutyleneterephthalate and of copolyester.

A preferential orientation of the crystalline portion, which is parallel to the direction of flow, is visible, especially for the copolyester.

EXAMPLE 5

The copolyester obtained by the procedures disclosed in Example 1 and polycarbonate, in a ratio of 30:100 by weight, are blended and extruded by using such techniques as disclosed in Example 4.

The temperatures used in the blending step and in the extrusion step are of respectively 240° C. and 225° C.

The value of the extensional modulus is normally comprised within the range of from 12 to 14 GPa, and the tensile strength value is normally comprised within the range of from 0.1 to 0.15 GPa.

The extruded blend shows, on X-ray examination, the typical crystalline phase of the copolyester.

We claim:
1. A thermotropic copolyester having a nematic structure of the liquid-crystalline phase within the temperature range of from about 200° C. to about 300° C., and which contains in its macromolecule units derived from:
(A) a saturated aliphatic dicarboxylic acid of the formula:

wherein n is a value within the range of 3 to 8;
(B) a 4,4'-dihydroxybiphenyl of the formula:

and
(C) a p-hydroxybenzoic acid of the formula:

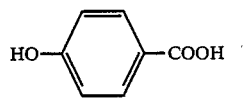

wherein the ratio of (A), (B) and (C) units relative to each other is within the range of from 1:1:0.5 to 1:1:8.

2. The thermotropic copolyester of claim 1, wherein the ratio of units (A), (B) and (C) is within the range of from 1:1:1 to 1:1:2.5.

3. The thermotropic copolyester of claim 2, wherein the value of n in the formula of the saturated aliphatic dicarboxylic acid unit ranges from 4 to 8.

4. A self-reinforced material prepared from the thermotropic copolyester of claim 1.

5. A reinforced material, comprising:
a thermoplastic material containing the thermotropic copolyester of claim 1 as a reinforcing component.

6. The reinforced thermoplastic material of claim 5, wherein said thermoplastic material is nylon, polybutylene terephthalate, polyethylene terephthalate or a polycarbonate.

* * * * *